US012736501B2

(12) United States Patent
Meng et al.

(10) Patent No.: US 12,736,501 B2
(45) Date of Patent: Sep. 15, 2026

(54) ELECTROPHORESIS TANK WITH SPLICING FUNCTION AND ELECTROPHORESIS DEVICE

(71) Applicant: SHANGHAI TANON LIFE SCIENCE CO., LTD, Shanghai (CN)

(72) Inventors: Chengwei Meng, Shanghai (CN); Zhou Yang, Shanghai (CN); Xinyuan Guo, Shanghai (CN)

(73) Assignee: SHANGHAI TANON LIFE SCIENCE CO., LTD, Shanghai (CN)

( * ) Notice: Subject to any disclaimer, the term of this patent is extended or adjusted under 35 U.S.C. 154(b) by 291 days.

(21) Appl. No.: 18/669,589

(22) Filed: May 21, 2024

(65) Prior Publication Data

US 2025/0244287 A1 Jul. 31, 2025

(30) Foreign Application Priority Data

Jan. 29, 2024 (CN) ......................... 202410124423.8

(51) Int. Cl.
*G01N 27/447* (2006.01)

(52) U.S. Cl.
CPC .............................. *G01N 27/44773* (2013.01)

(58) Field of Classification Search
CPC ....... G01N 27/44704; G01N 27/44773; G01N 27/44756
See application file for complete search history.

(56) References Cited

U.S. PATENT DOCUMENTS 6,063,250 A * 5/2000 Becker ............. G01N 27/44704 204/600

FOREIGN PATENT DOCUMENTS

CN 107356653 A 11/2017
CN 115616193 A 1/2023

OTHER PUBLICATIONS

CN 107356653, machine translation (Year: 2017).*

* cited by examiner

*Primary Examiner* — C. Sun

(74) *Attorney, Agent, or Firm* — Bayramoglu Law Offices LLC

(57) ABSTRACT

An electrophoresis tank with a splicing function and an electrophoresis device are provided. The electrophoresis tank mainly includes an electrophoresis tank body, a connecting frame, and multiple first wiring terminals arranged on the connecting frame, where the connecting frame includes a clamping boss and a clamping groove adapted to the clamping boss; the clamping boss and the clamping groove are configured to connect two adjacent electrophoresis tank bodies; and the first wiring terminals are configured to connect circuits between the two adjacent electrophoresis tank bodies.

18 Claims, 6 Drawing Sheets

ELECTROPHORESIS TANK WITH SPLICING FUNCTION AND ELECTROPHORESIS DEVICE

CROSS-REFERENCE TO THE RELATED APPLICATIONS

This application is based upon and claims priority to Chinese Patent Application No. 202410124423.8, filed on Jan. 29, 2024, the entire contents of which are incorporated herein by reference.

TECHNICAL FIELD

The present disclosure belongs to the technical field of electrophoresis tanks for biological protein gels, and in particular relates to an electrophoresis tank with a splicing function and an electrophoresis device.

BACKGROUND

In a molecular biology experiment, it is an indispensable experimental means to detect an experimental result by gel electrophoresis, and an electrophoresis tank is an important tool in the experiment.

Typically, in the prior art, gel separation experiments can only be conducted in single electrophoresis tanks. In the prior art, it is possible that a separation experiment of two precast gels may be conducted in a single electrophoresis tank, but the single electrophoresis tank in the prior art cannot meet the requirements for separation experiments of multiple precast gels. The separation experiments of more precast gels require higher sealing requirements for the electrophoresis tank. Once the buffer solution leaks, it will lead to inaccurate experimental results. Meanwhile, if single electrophoresis tanks are simply stacked, the distribution in the electrophoresis tanks is prone to disorder, and it is required to connect multiple power lines or provide multiple power sources on the basis of the prior art. This will result in an increase in equipment or in complex wiring connections, making it inconvenient for experimental personnel to operate.

SUMMARY

The present disclosure provides an electrophoresis tank with a splicing function. The present disclosure solves the problems mentioned in the background, that is, a single electrophoresis tank cannot meet the experimental requirements of multiple precast gels, and when multiple precast gel are placed in a single electrophoresis tank, the buffer solution may leak, leading to inaccurate experimental results.

To achieve the above objective, the present disclosure adopts the following technical solutions:

An electrophoresis tank with a splicing function includes:

an electrophoresis tank body, provided with an accommodation chamber and a first slot for communicating the accommodation chamber with the outside;

a connecting frame, provided at a side of the electrophoresis tank body to connect two adjacent electrophoresis tank bodies; and multiple first wiring terminals, arranged on the connecting frame, where when the two adjacent electrophoresis tank bodies are connected through the connecting frames, the multiple first wiring terminals on a first electrophoresis tank body can be connected to the first wiring terminals on a second electrophoresis tank body, thus allowing a series or parallel connection of circuits between the two adjacent electrophoresis tank bodies.

In some implementations, the connecting frame includes a clamping boss and a clamping groove adapted to the clamping boss; and when the two adjacent electrophoresis tank bodies are connected, the clamping boss of the first electrophoresis tank body is clamped into the clamping groove of the second electrophoresis tank body, or the clamping groove of the first electrophoresis tank body is clamped on the clamping boss of the second electrophoresis tank body.

In some implementations, the electrophoresis tank body and the connecting frame are at a preset angle; and the electrophoresis tank body is inclined relative to the connecting frame through the preset angle, causing the two adjacent electrophoresis tank bodies to be misaligned.

In some implementations, the electrophoresis tank body is provided with a connecting plate that is connected to the connecting frame; and the connecting plate is inclined relative to the electrophoresis tank body, such that the electrophoresis tank body is inclined relative to the connecting frame through the preset angle.

In some implementations, the clamping boss is provided with second slots; the clamping groove is provided with first bosses that are adapted to the second slots; and when the two adjacent electrophoresis tank bodies are connected through the second slots and the first bosses, the electrophoresis tank bodies are located on a same horizontal plane.

In some implementations, the second slots are provided along a side of the connecting frame; and when the two adjacent electrophoresis tank bodies are connected, the clamping boss on the connecting frame of the second electrophoresis tank body abuts against the connecting frame of the first electrophoresis tank body.

In some implementations, the connecting frame is provided with a first mounting plate at one side of the clamping boss; a first reinforcing rib is provided between the first mounting plate and the clamping boss; the first mounting plate is provided with second wiring terminals; and when the two adjacent electrophoresis tank bodies are connected, the first mounting plate on the connecting frame of the second electrophoresis tank body abuts against the connecting frame of the first electrophoresis tank body.

In some implementations, the first mounting plate is provided with first clearance grooves; and the first clearance grooves are in a position correspondence with the second slots.

In some implementations, the connecting frame is provided with a first support plate at one side of the clamping groove; the first support plate can abut against a side wall of an adjacent connecting frame; a second reinforcing rib is provided between the first support plate and the connecting frame; the first support plate is provided with first through-holes that are adapted to the second wiring terminals; and when the two adjacent electrophoresis tank bodies are connected, one end of the second wiring terminal on the first mounting plate of the second electrophoresis tank body passes through the first through-hole on the first support plate of the first electrophoresis tank body.

In some implementations, the connecting frame is provided with multiple hollow slots.

In some implementations, the electrophoresis tank further includes a first tank cover provided on the first slot of the electrophoresis tank body; the first tank cover is provided with multiple terminal caps; at least two of the terminal caps are in a position correspondence with the first wiring terminal; and the multiple terminal caps are connected through a connection terminal, thus allowing the series or parallel connection of the circuits between the two adjacent electrophoresis tank bodies.

In some implementations, the connecting frame and the electrophoresis tank body are detachably connected or integrated.

In some implementations, the present disclosure further provides an electrophoresis device, including multiple electrophoresis tanks according to each of the above implementations, where the multiple electrophoresis tanks are arranged linearly.

Compared with the prior art, the present disclosure has the following beneficial effects:

The electrophoresis tank body is provided with a connecting frame. The connecting frame is configured to splice multiple electrophoresis tank bodies into a whole, and is provided with first wiring terminals for connecting the electrodes on each electrophoresis tank body. The first tank cover is provided with corresponding terminal caps, and different first tank covers are provided with terminal caps. Thus, the first wiring terminals have different connection methods, which can realize the series or parallel connection of the circuits between different electrophoresis tank bodies fixed by clamping, to meet different experimental requirements. In addition, the multiple electrophoresis tank bodies can realize simultaneous experiments of multiple precast gels with different concentrations.

DETAILED DESCRIPTION OF THE EMBODIMENTS

The present application is described in more detail below with reference to the specific drawings. It should be noted that in the description of the embodiment, unless otherwise specified, the terms such as "upper" and "lower" indicate the orientation or position relationships based on the drawings. These terms are merely intended to facilitate and simplify the description of the present application, rather than to indicate or imply that the present application must have a specific orientation and must be constructed and operated in a specific orientation. Therefore, these terms should not be construed as a limitation to the present application.

Figure 1:
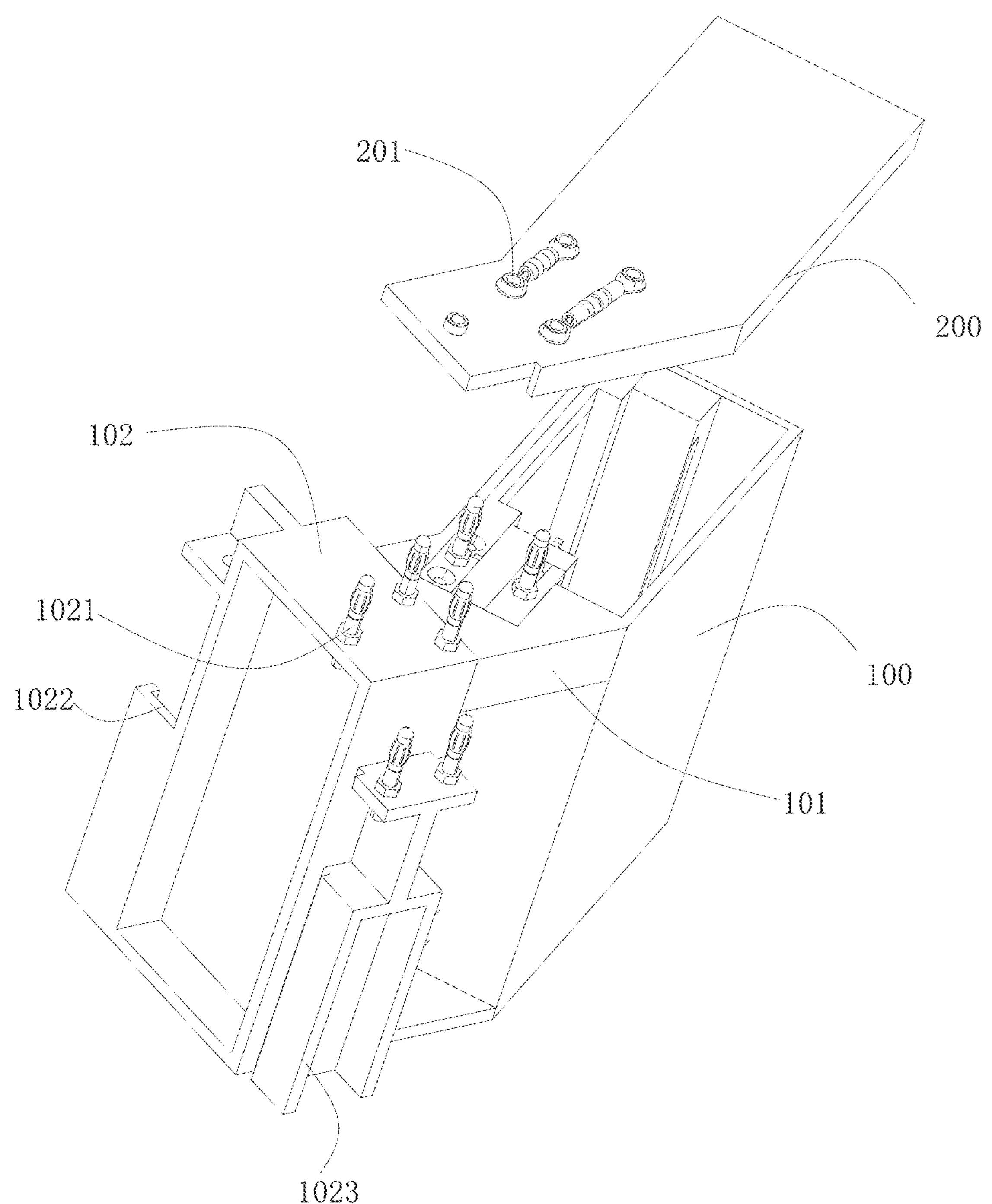
FIG. 1 is a first three-dimensional diagram of an electrophoresis tank with a splicing function according to the present disclosure.
Figure 2:
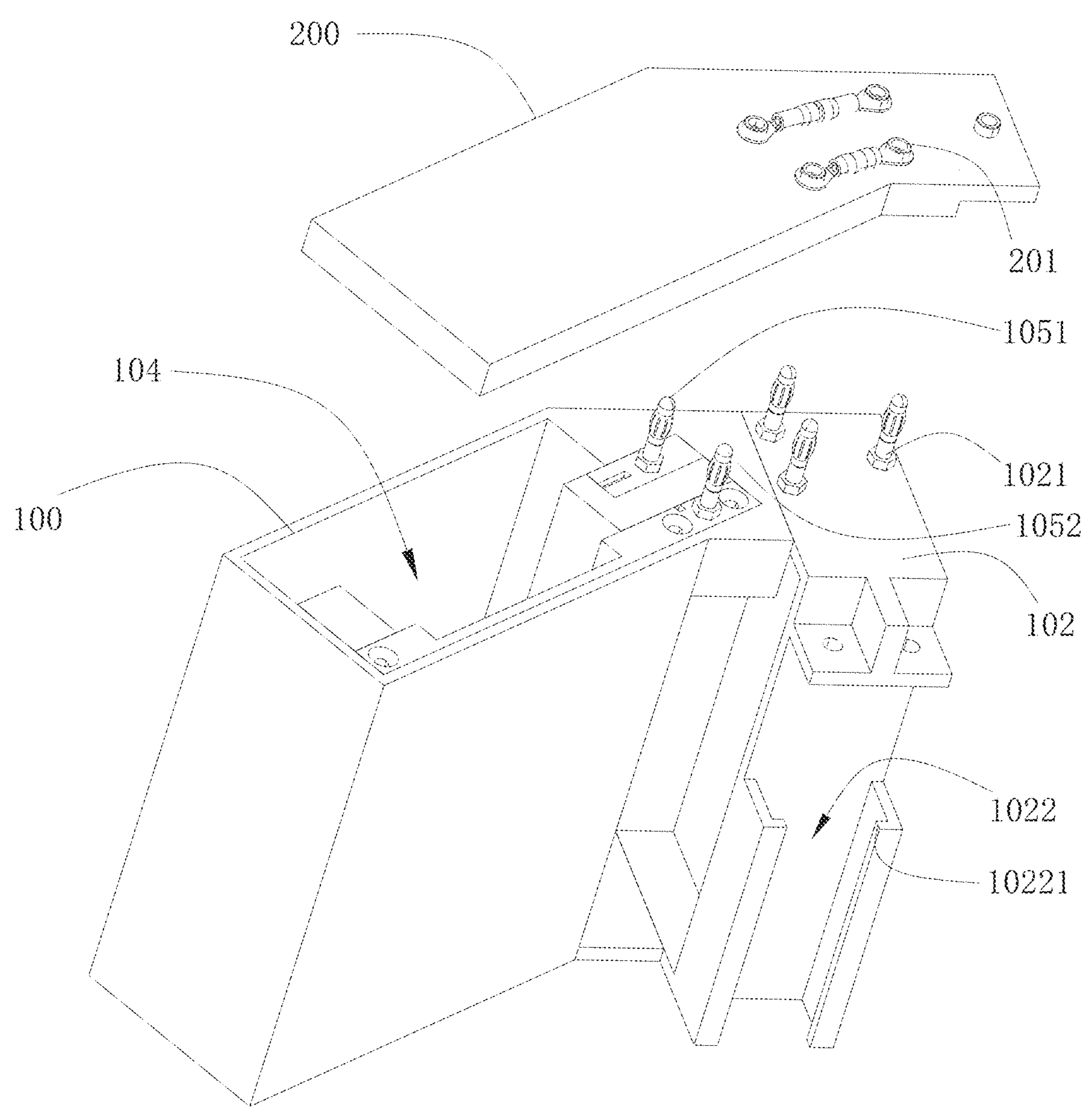
FIG. 2 is a second three-dimensional diagram of the electrophoresis tank with a splicing function according to the present disclosure.

As shown in FIGS. 1 and 2, the present disclosure provides an electrophoresis tank with a splicing function. The electrophoresis tank mainly includes electrophoresis tank body 100, connecting frame 102 provided at a side of the electrophoresis tank body 100, and multiple first wiring terminals 1021 arranged on the connecting frame 102. The electrophoresis tank body 100 is provided with accommodation chamber 104 and first slot communicating the accommodation chamber 104 with the outside. The accommodation chamber 104 is mainly configured to hold a buffer solution, a positive electrode assembly, a negative electrode assembly, and gel plates coated with precast gels. In this embodiment, the connecting frame 102 is integrated with the electrophoresis tank body 100, and the connecting frame 102 is configured to connect two adjacent electrophoresis tank bodies 100. In this embodiment, the connecting frame 102 and the electrophoresis tank body 100 are integrated by means of fixed connection. Alternatively, the connecting frame 102 and the electrophoresis tank body 100 are detachably connected. In addition, the connecting frame 102 includes clamping boss 1023 and clamping groove 1022 for connecting the two adjacent electrophoresis tank bodies 100. When the two adjacent electrophoresis tank bodies 100 are connected, the clamping boss 1023 of first electrophoresis tank body 100 is clamped into the clamping groove 1022 of second electrophoresis tank body 100, or the clamping groove 1022 of the first electrophoresis tank body 100 is clamped on the clamping boss 1023 of the second electrophoresis tank body 100. There are multiple first wiring terminals 1021 arranged on the connecting frame 102. In this embodiment, there are three first wiring terminals 1021. When the two adjacent electrophoresis tank bodies 100 are connected through the connecting frame 102, the first wiring terminals 1021 on the connecting frame 102 of the first electrophoresis tank body 100 are connected to the first wiring terminals 1021 on the connecting frame 102 of the second electrophoresis tank body 100. The design realizes a series or parallel connection of circuits between the two adjacent electrophoresis tank bodies 100, thus meeting different experimental requirements.

Figure 5:
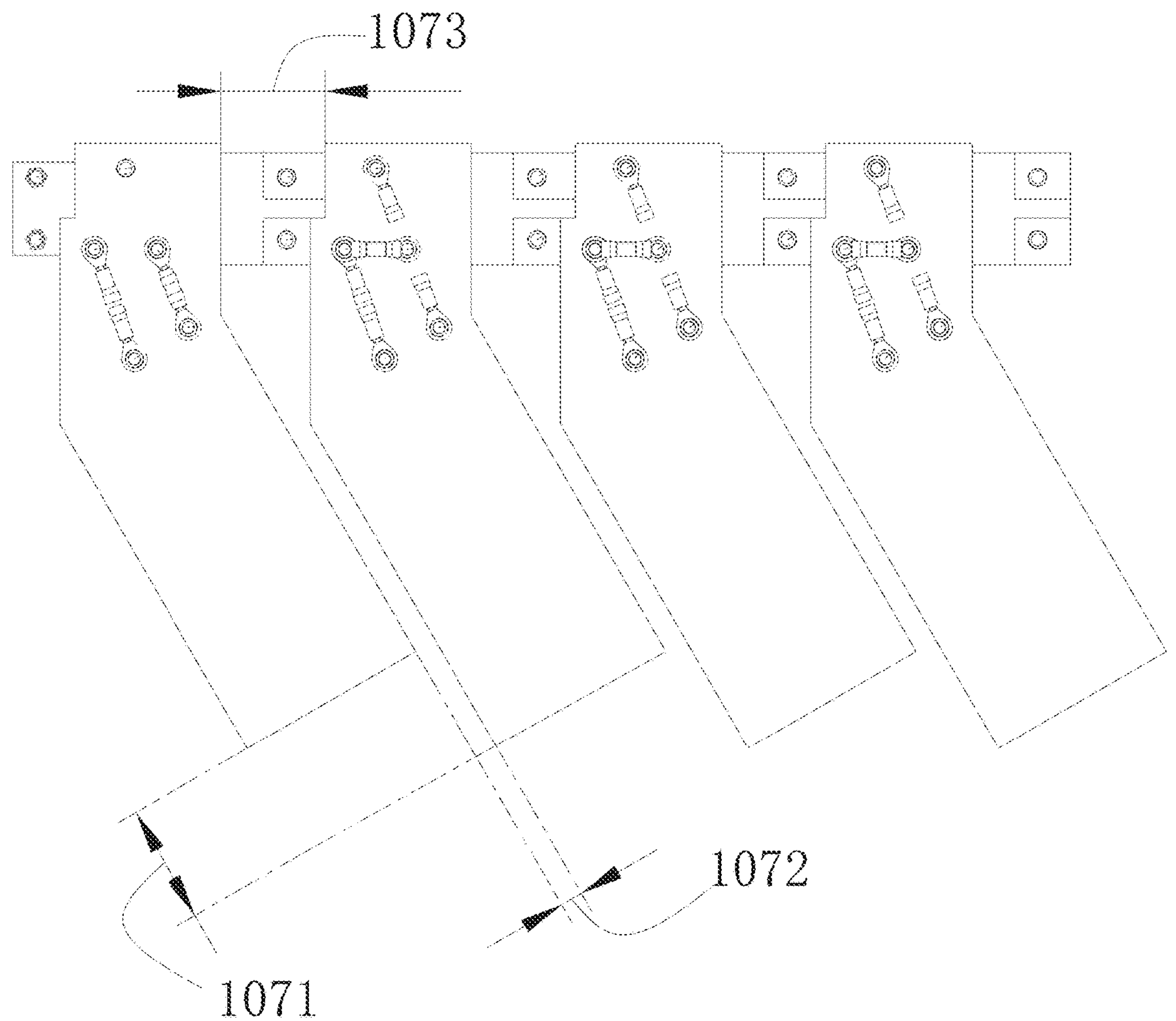
FIG. 5 is a top view of the electrophoresis device according to the present disclosure.

In an embodiment, due to the need to constantly monitor the electrophoresis experiment status of the precast gel, the electrophoresis tank body 100 and the connecting frame 102 are at a preset angle. The electrophoresis tank body 100 is connected to the connecting frame 102 through the preset angle, causing the two adjacent electrophoresis tank bodies 100 to be misaligned. As shown in FIG. 5, first spacing 1071 is formed between one side of the first electrophoresis tank body 100 away from the connecting frame 102 and one side of the second electrophoresis tank body 100 away from the connecting frame 102 through the preset angle, allowing experimenters to observe the electrophoresis situation in the second electrophoresis tank body 100 through the first spacing 1071.

Further, the electrophoresis tank body 100 is provided with connecting plate 101, in an integrated structure. The connecting plate 101 is connected vertically to the connecting frame 102. The connecting plate 101 is inclined relative to the electrophoresis tank body 100. The inclined design of the connecting plate 101 provides the preset angle between the electrophoresis tank body 100 and the connecting frame 102, and effectively reduces the volume of the electrophoresis tank body 100. Specifically, in this embodiment, there are two connecting plates 101 located at upper and lower ends of the electrophoresis tank body 100, respectively, and integrated with the connecting frame 102, ensuring a stable structure of the electrophoresis tank while reducing its own weight.

Figure 3:
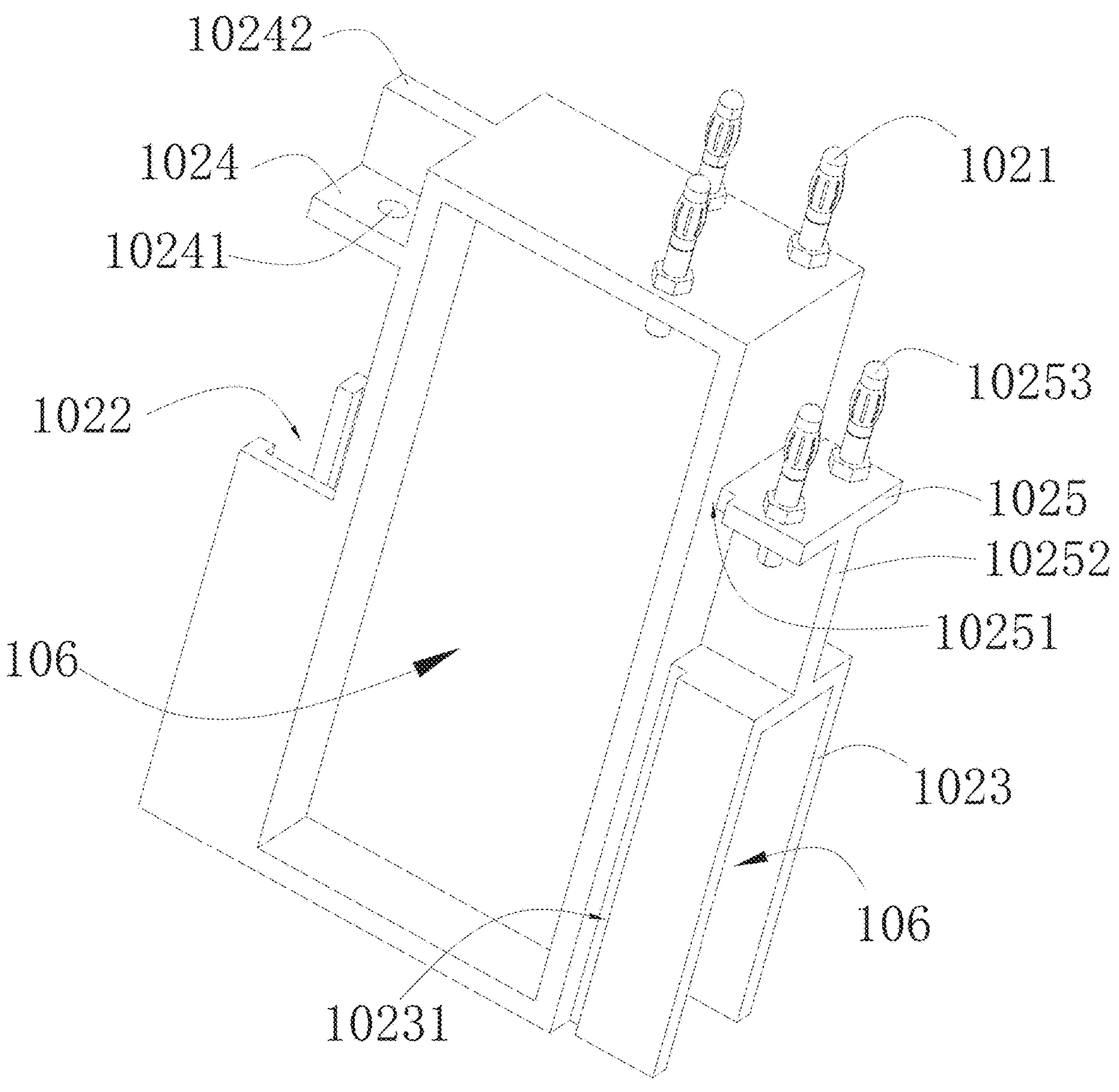
FIG. 3 is a three-dimensional diagram of a connecting frame of the electrophoresis tank with a splicing function according to the present disclosure.

In an embodiment, as shown in FIG. 3, the clamping boss 1023 is provided with second slots 10231. As shown in FIG. 2, the clamping groove 1022 is provided with corresponding first bosses 10221. The first bosses 10221 are adapted to the second slots 10231. When the two adjacent electrophoresis tank bodies 100 are connected, the first bosses 10221 on the connecting frame 102 of the first electrophoresis tank body 100 are clamped into the second slots 10231 on the connecting frame 102 of the second electrophoresis tank body 100. In this way, the two adjacent electrophoresis tank bodies 100 are fixedly connected, and the two adjacent electrophoresis tank bodies 100 are located on a same horizontal plane.

Further, the second slots 10231 are provided along a side of the connecting frame. When the first boss 10221 on the connecting frame 102 of the first electrophoresis tank body 100 is clamped into the second slot 10231 on the connecting frame 102 of the second electrophoresis tank body 100, the clamping boss 1023 on the connecting frame 102 of the second electrophoresis tank body 100 abuts against a side wall of the connecting frame 102 of the first electrophoresis tank body 100. In this way, the connection structure between the first electrophoresis tank body 100 and the second electrophoresis tank body 100 is stabilized. In this embodiment, the clamping groove 1022 includes two parallel side plates extending outward from the side wall of the connecting frame 102. Ends of the side plate away from the connecting frame 102 form the first bosses 10221. In this way, the clamping groove 1022 is formed.

In an embodiment, the connecting frame 102 is provided with first mounting plate 1025 at one side of the clamping boss 1023. The first mounting plate 1025 is provided with second wiring terminals 10253. In this embodiment, there are two second wiring terminals 10253 that are connected to positive and negative poles of a power supply, respectively. In order to further improve the stability of the first mounting plate 1025, first reinforcing rib 10252 is provided between the first mounting plate 1025 and the clamping boss 1023, such that the first mounting plate 1025 and the clamping boss 1023 are integrated, improving structural stability. Furthermore, in order to facilitate the connection between the two adjacent electrophoresis tank bodies 100, the first mounting plate 1025 is provided with first clearance grooves 10251. The first clearance grooves 10251 are in a position correspondence with the second slots 10231. The first bosses 10221 on the first electrophoresis tank body 100 pass through the second clearance grooves 10251 on the second electrophoresis tank body 100 and are clamped into the second slots 10231.

In an embodiment, the connecting frame 102 is provided with first support plate 1024 at one side of the clamping groove 1022. In this embodiment, the first support plate 1024 is located above the clamping groove 1022. When the two adjacent electrophoresis tank bodies 100 are connected, the first support plate 1024 abuts against the side wall of the connecting frame of the adjacent electrophoresis tank body 100, providing a stable structure between the two electrophoresis tank bodies 100. Further, second reinforcing rib 10242 is provided between the first support plate 1024 and the connecting frame 102, improving the stability of the first support plate 1024. The first support plate 1024 is provided with first through-holes 10241 that are adapted to the second wiring terminals 10253. When the two adjacent electrophoresis tank bodies 100 are connected, one end of the second wiring terminal 10253 on the first mounting plate 1025 of the second electrophoresis tank body 100 passes through the first through-hole 10241 on the first support plate 1024 of the first electrophoresis tank body 100. In this embodiment, the number of the first through-holes 10241 matches the number of the second wiring terminals 10253, and the number is 2. Further, a length of the first support plate is the same as that of the first mounting plate, forming second spacing 1073 between the two adjacent connecting frames. According to the second spacing 1073, third spacing 1072 is formed between the two adjacent electrophoresis tank bodies 100, making the two adjacent electrophoresis tank bodies 100 independent of each other. The design avoids thermal effects between the two adjacent electrophoresis tank bodies 100 and facilitates assembly between the two adjacent electrophoresis tank bodies 100. Optionally, the third spacing 1072 is zero, and the second spacing 1073 is determined according to a size of the first mounting plate 1025.

In an embodiment, to reduce the overall weight of the connecting frame 102, the connecting frame 102 is provided with multiple hollow slots 106. As shown in FIG. 3, a main body of the connecting frame 102 and the clamping boss 1023 are both provided with hollow slots 106. This design reduces the weight without affecting the connection strength, making it easy for experimenters to connect.

Figure 6:
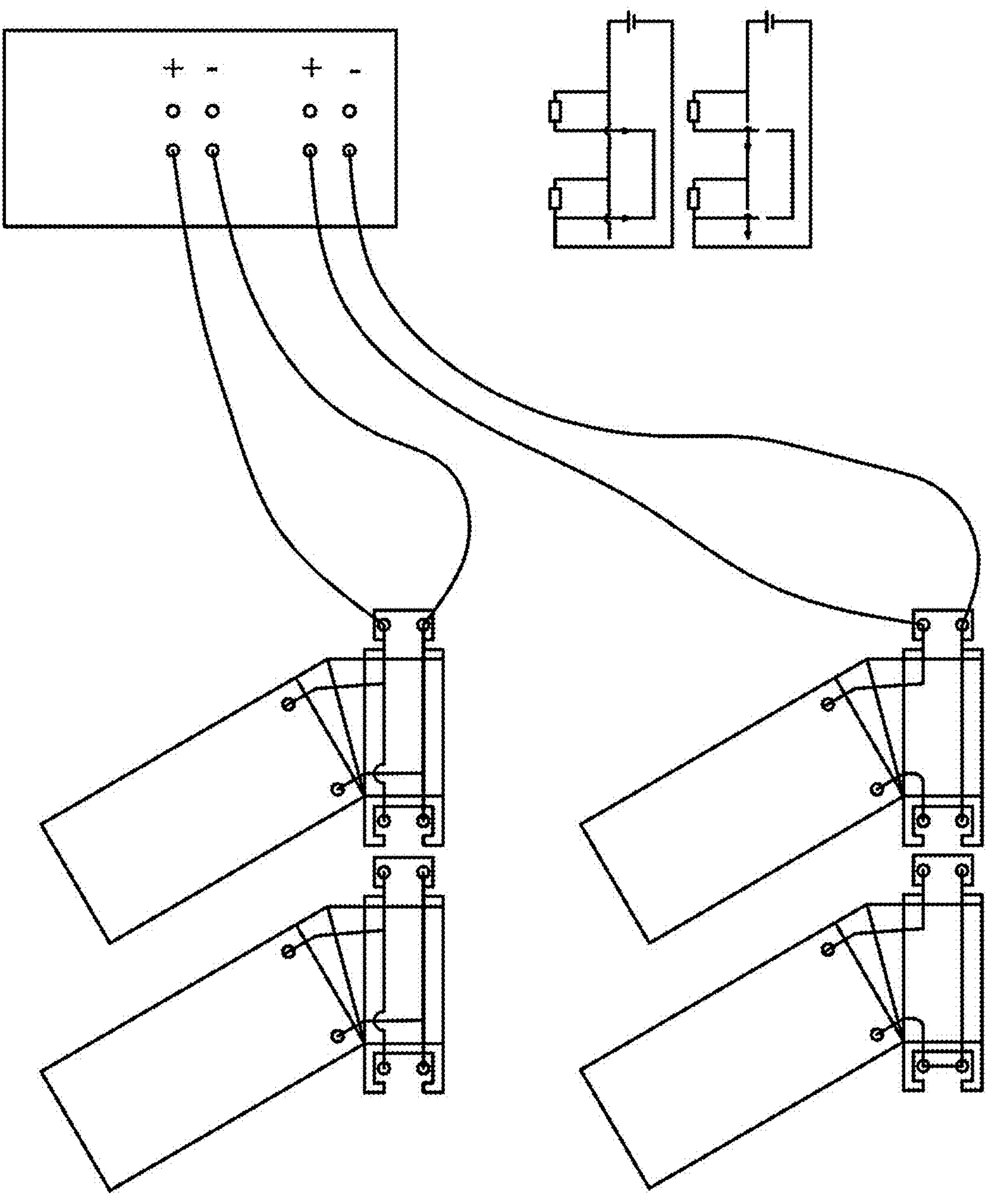
FIG. 6 is a wiring diagram of the electrophoresis device according to the present disclosure.

In an embodiment, the electrophoresis tank further includes first tank cover 200 provided on the first slot of the electrophoresis tank body 100. The first tank cover 200 covers the first slot. The first tank cover 200 is provided with multiple terminal caps 201. At least two of the terminal caps 201 are in a position correspondence with the first wiring terminal 1021, and at least two of the terminal caps 201 are in a position correspondence with positive electrode 1051 and negative electrode 1052 located in the accommodation chamber 104. The terminal caps 201 are connected through a preset connection terminal. When the first tank cover 200 is mounted on the first slot, a power source is connected to the positive electrodes 1051 and the negative electrodes 1052 on the electrophoresis tank bodies 100 through the first wiring terminals 1021, the terminal caps 201, and the connection terminals, thus realizing the series or parallel connection of circuits between the two adjacent electrophoresis tank bodies 100. In this embodiment, before mounting the first tank cover 200, the line connection between the terminal caps 201 on the first tank cover 200 is performed according to experimental requirements so as complete to circuit presetting. The first tank cover 200 is selectively provided according to experimental requirements, thus realizing different connection modes of circuits between the two adjacent electrophoresis tank bodies 100, as shown in FIG. 6.

Figure 4:
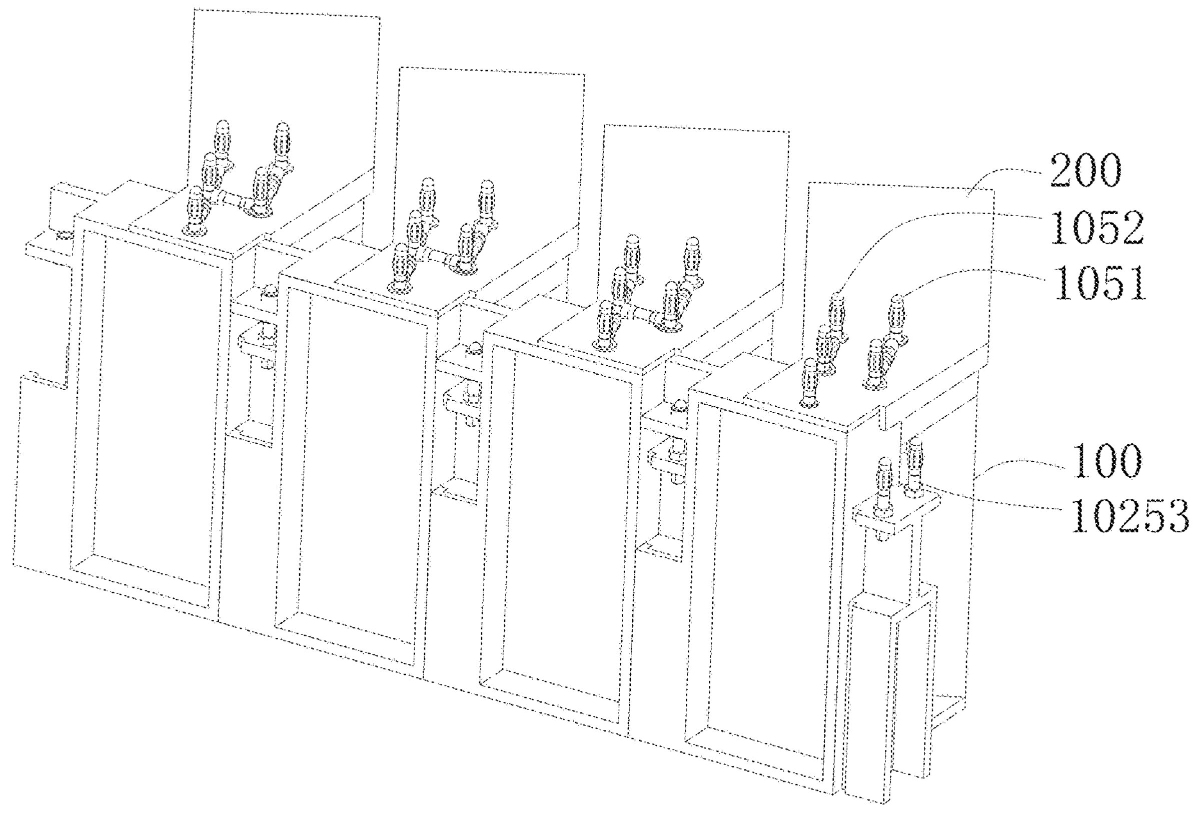
FIG. 4 is a three-dimensional assembly diagram of an electrophoresis device according to the present disclosure.

In an embodiment, the present disclosure further provides an electrophoresis device, which mainly includes the electrophoresis tank in each of the above embodiments. As shown in FIGS. 4 and 5, the multiple electrophoresis tank bodies 100 are arranged linearly to achieve simultaneous experiments with multiple gel plates coated with precast or handcast gels of different concentrations.

The above described are merely preferred implementations of the present disclosure. It should be noted that those of ordinary skill in the art may further make improvements and modifications to the present disclosure without departing from the principle of the present disclosure. However, these improvements and modifications should be deemed as falling within the protection scope of the present disclosure.

What is claimed is:

1. An electrophoresis tank with a splicing function, comprising:

an electrophoresis tank body, provided with an accommodation chamber and a first slot for communicating the accommodation chamber with outside;

a connecting frame, provided at a side of the electrophoresis tank body to connect two adjacent electrophoresis tank bodies; and a plurality of first wiring terminals, arranged on the connecting frame, wherein when the two adjacent electrophoresis tank bodies are connected through the connecting frames, the plurality of first wiring terminals on a first electrophoresis tank body are allowed to be connected to the plurality of first wiring terminals on a second electrophoresis tank body, wherein a series or parallel connection of circuits between the two adjacent electrophoresis tank bodies is allowed, wherein the electrophoresis tank body and the connecting frame are at a preset angle; and the electrophoresis tank body is inclined relative to the connecting frame through the preset angle, wherein the two adjacent electrophoresis tank bodies are misaligned.

2. The electrophoresis tank with the splicing function according to claim 1, wherein the connecting frame comprises a clamping boss and a clamping groove adapted to the clamping boss; and when the two adjacent electrophoresis tank bodies are connected, the clamping boss of the first electrophoresis tank body is clamped into the clamping groove of the second electrophoresis tank body, or the clamping groove of the first electrophoresis tank body is clamped on the clamping boss of the second electrophoresis tank body.

3. The electrophoresis tank with the splicing function according to claim 2, wherein the clamping boss is provided with second slots; the clamping groove is provided with first bosses, the first bosses are adapted to the second slots; and when the two adjacent electrophoresis tank bodies are connected through the second slots and the first bosses, the electrophoresis tank bodies are located on a same horizontal plane.

4. The electrophoresis tank with the splicing function according to claim 3, wherein the second slots are provided along a side of the connecting frame; and when the two adjacent electrophoresis tank bodies are connected, the clamping boss on the connecting frame of the second electrophoresis tank body abuts against the connecting frame of the first electrophoresis tank body.

5. The electrophoresis tank with the splicing function according to claim 4, wherein the connecting frame is provided with a first mounting plate at one side of the clamping boss; a first reinforcing rib is provided between the first mounting plate and the clamping boss; the first mounting plate is provided with second wiring terminals, as well as first clearance grooves, wherein the first clearance grooves are in a position correspondence with the second slots; and when the two adjacent electrophoresis tank bodies are connected, the first mounting plate on the connecting frame of the second electrophoresis tank body abuts against the connecting frame of the first electrophoresis tank body.

6. The electrophoresis tank with the splicing function according to claim 5, wherein the connecting frame is provided with a first support plate at one side of the clamping groove; the first support plate is allowed to abut against a side wall of an adjacent connecting frame; a second reinforcing rib is provided between the first support plate and the connecting frame; the first support plate is provided with first through-holes, the first through-holes are adapted to the second wiring terminals; and when the two adjacent electrophoresis tank bodies are connected, one end of the second wiring terminal on the first mounting plate of the second electrophoresis tank body passes through the first through-holes on the first support plate of the first electrophoresis tank body.

7. The electrophoresis tank with the splicing function according to claim 1, wherein the electrophoresis tank body is provided with a connecting plate, the connecting plate is connected to the connecting frame; and the connecting plate is inclined relative to the electrophoresis tank body, wherein the electrophoresis tank body is inclined relative to the connecting frame through the preset angle.

8. The electrophoresis tank with the splicing function according to claim 1, wherein the connecting frame is provided with a plurality of hollow slots.

9. The electrophoresis tank with the splicing function according to claim 1, further comprising a first tank cover provided on the first slot of the electrophoresis tank body, wherein the first tank cover is provided with a plurality of terminal caps; at least two of the plurality of terminal caps are in a position correspondence with the plurality of first wiring terminal; and the plurality of terminal caps are connected through a connection terminal, wherein the series or parallel connection of the circuits between the two adjacent electrophoresis tank bodies is allowed.

10. The electrophoresis tank with the splicing function according to claim 1, wherein the connecting frame and the electrophoresis tank body are detachably connected or integrated.

11. An electrophoresis device, comprising a plurality of electrophoresis tanks according to claim 1, wherein the plurality of electrophoresis tanks are arranged linearly.

12. An electrophoresis device, comprising a plurality of electrophoresis tanks according to claim 2, wherein the plurality of electrophoresis tanks are arranged linearly.

13. An electrophoresis device, comprising a plurality of electrophoresis tanks according to claim 7, wherein the plurality of electrophoresis tanks are arranged linearly.

14. An electrophoresis device, comprising a plurality of electrophoresis tanks according to claim 3, wherein the plurality of electrophoresis tanks are arranged linearly.

15. An electrophoresis device, comprising a plurality of electrophoresis tanks according to claim 4, wherein the plurality of electrophoresis tanks are arranged linearly.

16. An electrophoresis device, comprising a plurality of electrophoresis tanks according to claim 5, wherein the plurality of electrophoresis tanks are arranged linearly.

17. An electrophoresis device, comprising a plurality of electrophoresis tanks according to claim 6, wherein the plurality of electrophoresis tanks are arranged linearly.

18. An electrophoresis device, comprising a plurality of electrophoresis tanks according to claim 8, wherein the plurality of electrophoresis tanks are arranged linearly.

* * * * *